United States Patent [19]
Heitmiller

[11] Patent Number: 5,067,431
[45] Date of Patent: Nov. 26, 1991

[54] VIBRATING ARTICLE COATING AND CONVEYING APPARATUS

[75] Inventor: Charles E. Heitmiller, Crestwood, Ky.

[73] Assignee: Carrier Vibrating Equipment, Inc., Louisville, Ky.

[21] Appl. No.: 475,446

[22] Filed: Feb. 6, 1990

[51] Int. Cl.$^5$ .................. B65G 27/02; B05C 11/02
[52] U.S. Cl. .................. 118/57; 118/58; 118/64; 118/423; 118/425
[58] Field of Search .................. 118/57, 22, 58, 64, 118/425, 423; 198/755, 756, 757

[56] References Cited

U.S. PATENT DOCUMENTS

| | | | |
|---|---|---|---|
| 2,827,062 | 3/1958 | Nitsche | 198/756 |
| 3,216,431 | 11/1965 | White | 198/757 |
| 3,258,852 | 7/1966 | White | 198/756 |
| 3,882,820 | 5/1975 | Hock | 198/756 |

FOREIGN PATENT DOCUMENTS

| | | | |
|---|---|---|---|
| 1110569 | 7/1961 | Fed. Rep. of Germany | 198/757 |
| 681704 | 10/1952 | United Kingdom | 198/757 |

Primary Examiner—Richard V. Fisher
Assistant Examiner—Brenda Lamb
Attorney, Agent, or Firm—Jon C. Winger

[57] ABSTRACT

A vibratory article coating and conveying apparatus for coating articles with a surface coating material and conveying the coated articles. The apparatus has a base, a coating material reservoir located above the base for containing the article coating material and for receiving the articles to be coated, and a vertical helical conveying flight structure having its bottom inlet end in open communication with the reservoir to receive coated articles from the reservoir and for conveying the coated articles upwardly out of the reservoir to an article discharge at the top of the flight structure. A vibratory force generating device is associated with the reservoir and the helical conveying flight structure to impart a cyclical generally torsional motion to the reservoir and helical conveyor flight.

4 Claims, 2 Drawing Sheets

VIBRATING ARTICLE COATING AND CONVEYING APPARATUS

BACKGROUND OF THE INVENTION

The present invention relates to helical conveying apparatus, and more particularly to a helical conveying apparatus for coating articles with a surface coating material and conveying the coated articles.

Helical conveyor devices are per se known. Also linear conveyor devices for coating articles are known.

However, there are no vertical helical apparatus known to me which coats articles with a coating material and conveys the coated articles.

SUMMARY OF THE INVENTION

The present invention provides a vibratory article coating and conveying apparatus for coating articles with a surface coating material and conveying the coated articles comprising a base, a coating material reservoir located above the base for containing the article coating material and for receiving the articles to be coated, and a vertical helical conveying flight having its bottom inlet end in open communication with the reservoir to receive coated articles from the reservoir and for conveying the coated articles upwardly out of the reservoir to an article discharge at the top of the flight, and means for imparting a cyclical generally torsional motion to the reservoir and vertically oriented helical conveyor flight.

BRIEF DESCRIPTION OF THE DRAWING

A better understanding of the present invention will be had with reference to the following description in conjunction with the accompanying drawings wherein like numerals refer to like parts throughout the several views and in which.

DETAILED DESCRIPTION OF THE PREFERRED EMBODIMENTS

Figure 1:
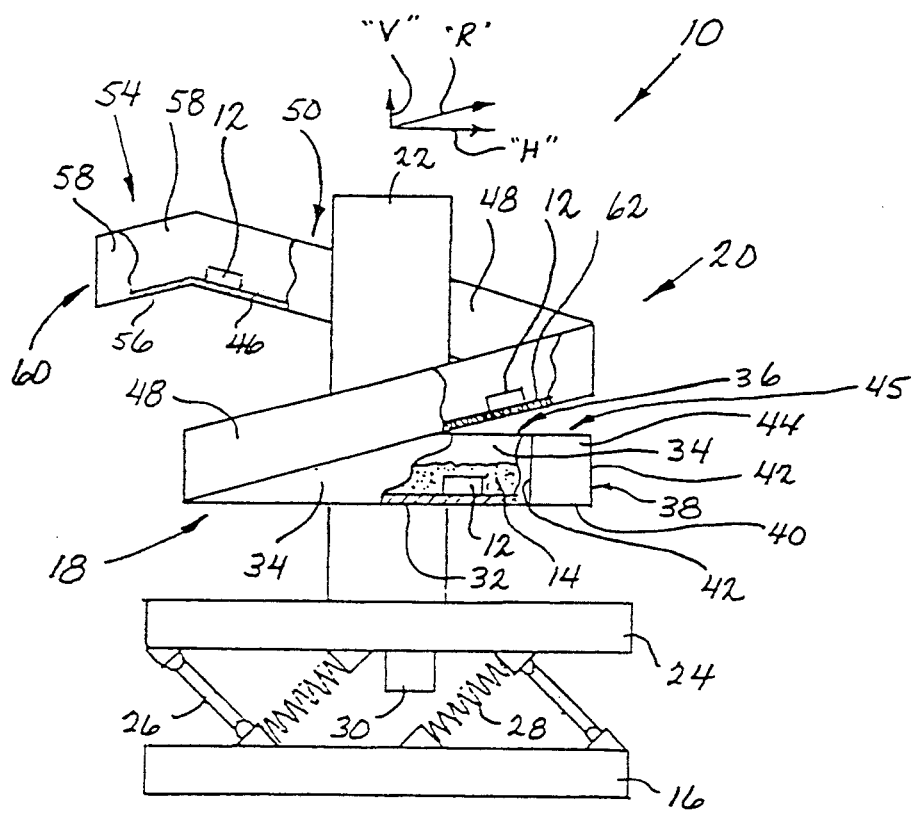
FIG. 1 is a side view of one embodiment of the present invention shown in partical cross-section to more clearly show details.
Figure 2:
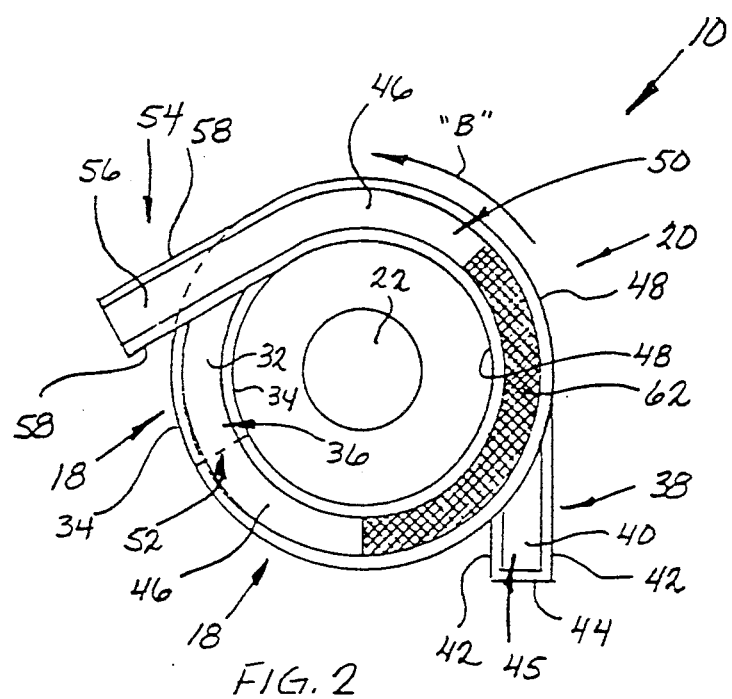
FIG. 2 is a top view of the apparatus of FIG. 1.

With reference to FIGS. 1 and 2, there is shown a vibratory apparatus, generally denoted as the numeral 10, of the present invention for coating articles 12 with a surface coating material 14 and conveying the articles 12.

The vibratory apparatus 10 comprises a base 16 for supporting the apparatus 10 on a floor of a facility in which the apparatus 10 is installed, a reservoir 18 for containing the coating material 14, and a vertically oriented helical conveyor flight structure 20 along which the coated articles 12 are conveyed.

As shown, the apparatus 10 includes a central, vertical, generally cylindrical support structure 22 attached at its bottom end to a mounting plate 24. The mounting plate 24 is vertically spaced above the base 16 and is supported above the base 16 by link arms 26 each pivotally attached at its top end to the mounting plate 24 and pivotally attached at its bottom end to the base 16. In addition, resilient means 28, such as coil springs interconnect the base 16 and mounting plate 24. Drive means, generally denoted as the numeral 30, such as for example, a rotating eccentric weight drive is mounted to the mounting plate 24 to impart a cyclical torsional force to the mounting plate 24 and, therefore, the vertical support structure 22 about the vertical longitudinal centerline of the vertical support structure. Preferably, the drive means 30 imparts a cyclical torsional force "R" at an angle corresponds to the helix angle of the helical conveyor flight structure 20 such that the cyclical torsional force "R" has a horizontal component "H" and a vertical component "V".

As shown in FIGS. 1 and 2, the reservoir 18 is toroidal in configuration, concentrically located with the vertical support structure 22, and affixed to the support structure 22 for motion therewith. The reservoir 18 includes a floor 32, side walls 34 and is open along its top area 36. As can be best seen in FIG. 2, the reservoir 18 can include an article inlet extension 38 projecting generally tangentially outwardly from the toridially shaped portion of the reservoir 18. The article inlet extension 38 is shown as having a floor 40 contiguous with the reservoir floor 32, side walls 42 contiguous with the reservoir side walls 34 defining an open topped channel, and an end wall 44 to prevent the coating material 14 from flowing out of the inlet extension 38. The inlet extension 38 is open along its top area 45 defining an open article inlet through which articles 12 to be coated can be deposited in the reservoir 18 through the open top area 45. The reservoir 18 is substantially horizontally mounted on the central support structure 22.

With continued reference to FIGS. 1 and 2, the helical conveyor flight structure 20 is concentrically located with the vertical support structure 22, and affixed to the support structure 22 for motion therewith. The helical conveyor flight structure 20 includes a floor 46, side walls 48 and is open along its top area 50 defining an open topped helical conveying channel. The helical conveyor 20 has an open article inlet end 52 in open communication with the reservoir 18 to receive coated articles 12. Toward this objective, the conveyor floor 46 is contiguous with the reservoir floor 32 and the conveyor side walls 48 are contiguous with the reservoir side walls 34. It should be clearly understood that while the conveyor flight structure 20 is shown as having only one spiral flight for the sake of simplicity of illustration, it can be formed with multiple spiral flights. The conveyor structure 20 can include an article discharge extension 54 projecting generally tangentially outwardly from the helical conveyor flight structure 20 of the apparatus 10. The article discharge extension 54 is shown as having a floor 56 contiguous with the helical conveyor floor 46, side walls 58 contiguous with the helical conveyor side walls 48, and article discharge opening 60 at its cantilevered end through which coated articles 12 exit the conveyor structure 20. The tangentially extending article inlet extension 38 and tangentially extending article discharge extension 54 are advantageous in that they located the article inlet opening 45 and article discharge opening 60 outside the perimeter of the helical conveyor structure 20.

In operation of the apparatus 10 discussed above, the drive means 30 imparts a conveying motion to the helical conveyor flight structure 20 in the spiral direction indicated by the spiral arrow "B" in FIG. 2. Articles 12 to be coated are placed in the reservoir 18 through the article inlet opening 45. The articles 12 are conveyed through the reservoir 18 from the article inlet opening 45 to the bottom article inlet end 52 of the helical conveyor structure 20 due to the torsional motion imparted by the drive means 30 so that they are coated with the material 14 as they move through the reservoir 18. The coated articles 12 then enter the helical conveyor 20 through its open inlet end 52 and are conveyed upwardly along the helical conveyor channel to and through the article discharge 60 at the top end of the conveyor flight structure 20 also due to the torsional motion imparted by the drive means 30.

As shown best in FIG. 2, at least a portion of the length of the conveyor floor 46 is of open reticulated construction or screen 62. As the coated articles 12 are conveyed along the helical conveyor channel, excess coating material is shaken off the articles 12 and falls downwardly through the screen 62 onto coated articles 12 being conveyed on the next lower turn of the helical conveyor flight to assure complete coating of the articles 12, and eventually back into the reservoir 18 itself, so that the excess coating material will not be wasted.

Figure 3:
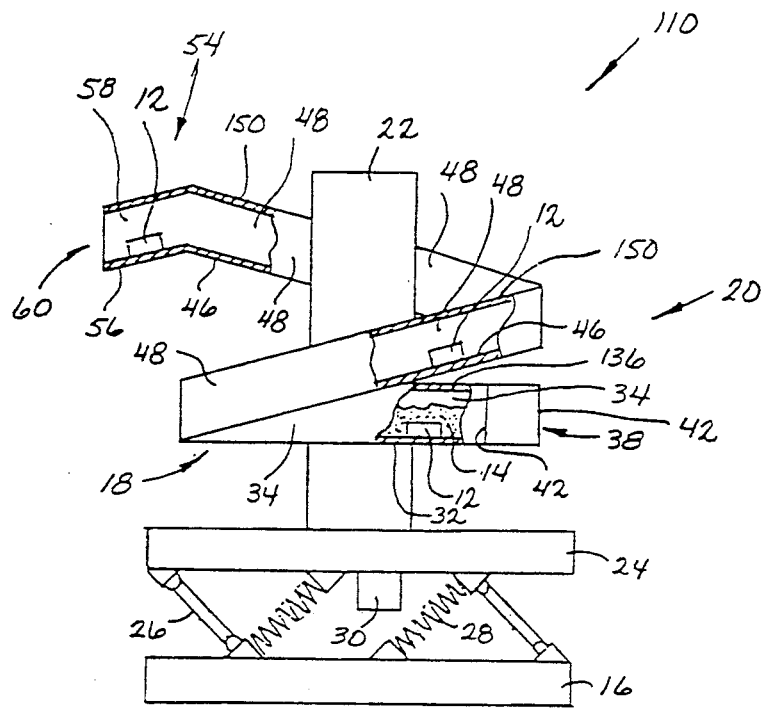
FIG. 3 is a side view of another embodiment of the present invention shown in partial cross-section to more clearly show details.

Now with reference to FIG. 3, there is shown another embodiment of a vibratory apparatus, generally denoted as the numeral 110, of the present invention for coating articles 12 with a surface coating material 14 and conveying the coated articles adapted to provide at least some control over the coating material which may have a tendency to leave the apparatus 10 into the ambient atmosphere. The vibratory apparatus 110 has numerous features in common with the vibratory apparatus 10 of FIGS. 1 and 2. Therefore, these common features are denoted by identical numerals and, for the sake of brevity, the description of the common features will not be repeated. The only differences between the vibratory apparatus 10 and the apparatus 110 is that in the apparatus 110, the reticulated section or screen 62 has been eliminated, the reservoir 18 includes a top wall 136 closing the top of the reservoir 18, and the helical conveyor flight structure 20 includes a top wall 150 closing the top of the helical conveyor structure 20. The top wall 136 over the reservoir 18 and the top wall 150 over the helical conveyor flight structure 20 prevents substantial amounts of coating material from entering the atmosphere.

Figure 4:
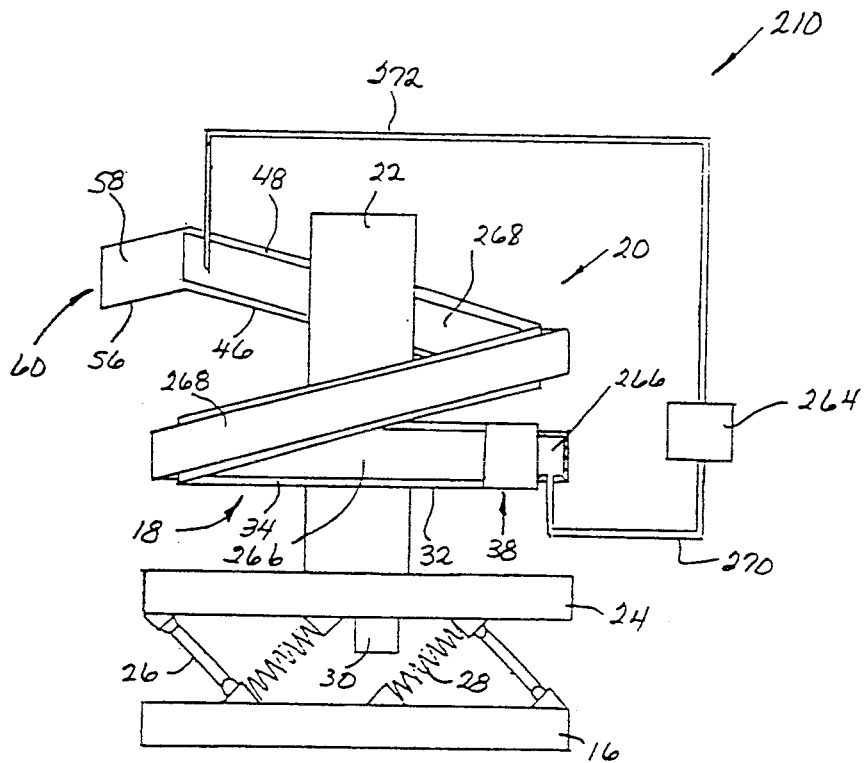
FIG. 4 is a side view of yet another embodiment of the present invention in partial cross-section to more clearly show details.

Turning now to FIG. 4, there is shown yet another embodiment of a vibratory apparatus, generally denoted as the numeral 210, of the present invention for coating articles with a surface coating material, and conveying the coated articles adapted to condition the temperature of the coated articles being conveyed. The vibratory apparatus 210 has numerous features in common with the vibratory apparatus 10 of FIGS. 1 and 2, and the apparatus 110 of FIG. 3. Therefore, these common features are denoted by identical numerals and, for the sake of brevity, the description of the common features will not be repeated. The vibratory apparatus 210 includes air conditioning means 264 for conditioning the air within the reservoir 18 or within the helical conveyor flight structure 20, or within both the reservoir 18 and helical conveyor flight structure 20. Toward this objective, the reservoir 18 can be formed with air conditioning media circulation jackets 266 in its side walls 34, floor 32, and top wall 136. Similarly, the helical conveyor flight structure 20 can be also be formed with similar air conditioning media circulation jackets 268 in its side walls 48, floor 46, and top wall 150. The conditioning means 264 can be of virtually any type such as, for example, a steam generating device, or chilled water generating device, or reversible cycle heat pump device. The conditioning media, be it, for example, steam, cold water, temperature conditioned air, or temperature conditioned refrigerant, or some other media, flows from the conditioning means 264 through a supply conduit 270 to the air conditioning media jackets 266 of the reservoir 18 and air conditioning media jacket 268 of the helical conveyor flight structure 20, and returns back to the conditioning means 264 through a return conduit 272 after it has circulated through the jackets 266, 268. As the conditioning media flows through the jackets 266 and 268, it heats or cools, as required, the coating material 14, articles 12, and the air within the reservoir 18 and conveyor flight structure 20.

The foregoing is given for clearness of understanding and no unnecessary limitations are to be understood therefrom for modifications will become obvious upon reading this disclosure and may be made without departing from the spirit of the invention and scope of the appended claims.

What is claimed is:

1. A vibrating coating and conveying apparatus for coating articles with a surface coating material and conveying the articles, comprising:

a base;

a reservoir disposed above the base for containing the surface coating material and for receiving the articles to be coated;

a vertically oriented helical conveying flight structure of multiple spiral flights having its bottom end open to the reservoir to receive coated articles from the reservoir through the open bottom end, and for conveying the coated articles generally upwardly out and away from the reservoir to an article discharge at the top end of the flight structure, the spiral flights of the flight structure being all of substantially equal circumferential dimension, the spiral flights having a floor, side walls and open top, and at least a portion of the floor of at least one of the uppermost spiral flights of the multiple spiral flights being of open reticulated construction for the passage of excess coating material downwardly therethrough and into the next lower spiral flight through the open top of the next lower spiral flight to assure complete coating of the articles being conveyed in the helical structure; and, means for imparting a cyclical generally torsional motion to the reservoir and vertically oriented helical flight structure.

2. The vibrating coating and conveying apparatus of claim 1, wherein the reservoir comprises an article inlet extension extending outwardly beyond the perimeter of the vertically oriented helical conveying flight structure.

3. The vibrating coating and conveying apparatus of claim 1, wherein the helical conveying flight structure comprises an article discharge extension extending outward beyond the perimeter of the vertically oriented helical conveying flight structure.

4. The vibrating coating and conveying apparatus of claim 1, wherein at least a portion of the floor of the bottom-most spiral flight of the multiple spiral flights is of open reticulated construction for the passage of excess coating material downwardly therethrough and back into the reservoir.

* * * * *